United States Patent [19]

Seiner et al.

[11] 4,373,083

[45] Feb. 8, 1983

[54] PROCESS OF MAKING URETHANE RHEOLOGY MODIFIERS

[75] Inventors: Jerome A. Seiner, Pittsburgh; Karl F. Schimmel, Verona, both of Pa.

[73] Assignee: PPG Industries, Inc., Pittsburgh, Pa.

[21] Appl. No.: 220,886

[22] Filed: Dec. 29, 1980

[51] Int. Cl.³ .................... C08G 18/12; C08G 18/48
[52] U.S. Cl. .................................... 528/67; 524/104; 524/108; 524/111; 524/233; 524/205; 524/378; 525/123; 525/452; 528/69; 528/76; 528/44
[58] Field of Search .................. 260/33.2 R, 30.4 N, 260/32.6 NR, 13, 30.2, 32.4; 525/123, 452; 528/67, 69, 76, 44

[56] References Cited

U.S. PATENT DOCUMENTS

| | | | |
|---|---|---|---|
| 3,326,821 | 6/1967 | Lesser | 260/2.5 |
| 3,483,163 | 12/1969 | Sommer et al. | 260/75 |
| 3,939,123 | 2/1976 | Matthews et al. | 260/77.5 AM |
| 4,061,618 | 12/1977 | Stanley et al. | 260/29.2 TN |
| 4,079,028 | 3/1978 | Emmons et al. | 528/85 |
| 4,118,354 | 10/1978 | Harada et al. | 260/29.2 TN |
| 4,131,604 | 12/1978 | Szycher | 528/79 |
| 4,134,610 | 1/1979 | Lindewall | 260/2.5 AP |
| 4,155,892 | 5/1979 | Emmons et al. | 260/29.2 TN |
| 4,180,491 | 12/1979 | Kim et al. | 260/29.2 TN |
| 4,327,008 | 4/1982 | Schimmel et al. | 524/104 |

*Primary Examiner*—H. S. Cockeram
*Attorney, Agent, or Firm*—Charles R. Wilson

[57] ABSTRACT

Rheology modifiers useful in water and organic solvent-based compositions are derived from the reaction of polyalkylene oxide, polyfunctional material, diisocyanate, water and end-capping compounds in an organic solvent. The organic solvent is compatible with latex coating compositions.

15 Claims, No Drawings

PROCESS OF MAKING URETHANE RHEOLOGY MODIFIERS

BACKGROUND OF THE INVENTION

This invention relates to processes for making rheology modifiers. More particularly, the invention relates to processes for making urethane rheology modifiers especially useful in water-based and organic solvent-based compositions.

Additives have long been used in coating compositions for various purposes. Thus, viscosity control agents, surfactants, sag-control agents, anti-foaming agents and other materials are added to coating compositions in minor amounts for their respective functions. Rheology modifiers are also added to such compositions not only for increasing the viscosity of the coating composition but to maintain the viscosity at desired levels under varying process conditions and end-use situations. Secondary effects obtained from the rheology modifiers include protective colloidal action, improvement in pigment suspension, leveling and flow. Some of these properties are also desired in similar type compositions, for instance textile treating compositions, cosmetics, paper compositions, well drilling, fire-fighting foams, detergents, pharmaceuticals, agricultural formulations, and emulsions of all kinds. It can be seen rheology modifiers are used in a variety of compositions.

Many well-known rheology modifiers are used with varying degrees of success. Thus, natural products such as the alginates, casein, and gum tragacanth and modified natural products such as methyl cellulose and hydroxyethyl cellulose are useful rheology modifiers. Synthetic rheology modifiers have also been used. These materials include the carboxyvinyl ether copolymers, acrylic polymers and maleic anhydride/styrene copolymers.

U.S. Pat. No. 4,079,028 describes rheology modifiers which are said to be useful in latex paints. The described modifiers have hydrophobic tails and their molecular structure can be linear, branched or star-shaped. The branched modifiers have been found to be particularly useful; however the disclosed process for making them is somewhat cumbersome in that it is necessary to remove the solvent medium in which they are made, physically break up the modifiers and redisperse them in a solvent compatible with the latex paint.

There has now been found processes for making rheology modifiers of the type described in U.S. Pat. No. 4,079,028 by convenient and economical processes. The modifiers obtained by these processes are in a fluid form which can be readily added to latex paints without a consequent compatibility problem.

As used herein, all percents and ratios are by weight unless otherwise stated.

SUMMARY OF THE INVENTION

Disclosed herein are processes for making rheology modifiers derived from the reaction product of 8 moles of a polyalkylene oxide, from about 0.1 to about 3 moles of a polyfunctional material, from about 4 to about 15 moles of a diisocyanate, less than about 3 moles water, additional diisocyanate to compensate for any water present, and monofunctional active hydrogen-containing compound or monisocyanate. The processes involve reacting the above reactants in an organic solvent selected from the group consisting of 1-methyl-2-pyrrolidinone, dimethyl formamide, dimethyl acetamide, gamma butyrolactone, dioxane, acetonitrile, dimethyl and diethyl ethers of ethylene glycol and diethylene glycol, and mixtures thereof.

The rheology modifiers made by the processes of this invention are useful in water-based as well as organic solvent-based compositions. The rheology modifiers are especially useful in latex coating compositions.

DETAILED DESCRIPTION OF THE INVENTION

The following paragraphs describe the reactants used in making the rheology modifiers and processes of making the modifiers. While the discussion of the reaction products which follows is in reference to them as "rheology modifiers," it should be understood this term is used broadly. That is, "rheology modifiers" is meant to encompass such terms as thickening agents, thixotropic agents, viscosity modifiers and gelling agents.

The rheology modifiers useful herein are derived from the reaction of polyalkylene oxides, polyfunctional materials, diisocyanates, water and end-capping compounds. The modifiers have a branched chain structure and are characterized by having terminal hydrophobic groups.

Polyalkylene oxides used in the reaction include the polyethylene oxide diols, polypropylene oxide diols, and polybutylene oxide diols. These materials have a molecular weight of from about 2,000 to about 20,000, preferably from about 4,000 to about 12,000. The aforementioned molecular weights are weight average molecular weights determined by gel permeation chromatography, using a polystyrene standard. The polyethylene oxide is a preferred polyalkylene oxide, especially when the resultant rheology modifier is used in water-based compositions.

The polyfunctional material has either at least 3 active hydrogens and is capable of reacting with an isocyanate or is a polyisocyanate with at least 3 isocyanate groups. Classes of materials useful as the polyfunctional material include polyols, amines, amine alcohols, thiols and polyisocyanates. The preferred polyfunctional material is a polyol having a hydroxyl functionality of at least three. Examples of such materials include the polyalkylols, e.g., trimethylolpropane, trimethylolethane and pentaerythritol; the polyhydroxyalkanes, e.g., glycerol, erythritol, sorbitol, and mannitol; polyhydric alcohol ethers such as those derived from the aforementioned alcohols and alkylene oxides; cycloaliphatic polyhydric compounds, e.g., trihydroxyl cyclohexanes; and aromatic compounds such as trihydroxybenzene. Preferred polyols are the trifunctional alcohols, especially trimethylolpropane. Additional examples of polyfunctional materials include diethylenetriamine; triethylenetetramine; diethanolamine; triethanolamine; triisopropanolamine; trimercaptomethylpropane; triphenyl methane-4,4′,4″-trisocyanate; 1,3,5-triisocyanate benzene; 2,4,6-triisocyanate toluene; 4,4′-diphenyl-dimethyl methane-2,2′-5,5′-tetraisocyanate; and hexamethylene diisocyanate trimer, such as Mobay Chem. Co.'s Desmodur N. The level of polyfunctional material ranges from about 0.5 moles to about 3 moles, preferably from about 1 mole to about 3 moles for each 8 moles of the polyalkylene oxide in the reaction mixture.

A third component used in the reaction mixture is a diisocyanate at a level of from about 4 moles to about 15 moles, preferably from about 6 moles to about 12 moles for each 8 moles polyalkylene oxide. Diisocyanate, in addition to these amounts, is used if there is water present in the reaction mixture. (As discussed later, water can be present in minor amounts). As well known, water consumes isocyanate functionality. Accordingly, an amount of additional diisocyanate based on any water present is also used in the reaction to maintain the stoichiometry of the reaction. Several different hydrocarbon or substituted hydrocarbon diisocyanates are useful including the aliphatic, cycloaliphatic and aromatic diisocyanates either alone or in admixture. Generally available diisocyanates have the formula OCNR-NCO where R is arylene, e.g., phenylene and diphenylene; alkylarylene, e.g., dimethylbiphenylene, methylenebisphenyl and dimethylmethylenebisphenylene; alkylene, e.g., methylene, ethylene, tetramethylene, hexamethylene, a 36 methylene species, and trimethylhexylene; and alicyclic, e.g., isophorone and methylcyclohexylene. Still other useful diisocyanates include those of the above formula where R is a hydrocarbon group containing ester or ether linkages. Specific examples of suitable diisocyanates include 1,4-tetramethylene diisocyanate; 1,6-hexamethylene diisocyanate; 2,2,4-trimethyl-1,6-diisocyanato hexane; 1,10-decamethylene diisocyanate; 1,4-cyclohexylene diisocyanate; 4,4'-methylene bis (isocyanato cyclohexane); p-phenylene diisocyanate; 2,6-toluene diisocyanate; 2,4-toluene diisocyanate; xylene diisocyanate; isophorone diisocyanate; bis para-isocyanato cyclohexylmethane; 4,4'-bisphenylene diisocyanate; 4,4'-methylene diphenyl isocyanate; 1,5-napthalene diisocyanate; and 1,5-tetrahydronaphthalene diisocyanate. Preferred are the toluene diisocyanates and the cycloaliphatic diisocyanates, especially isophorone diisocyanate and bis para-isocyanato cyclohexylmethane.

A fourth component which can be used in the reaction mixture in minor amounts is water. The water is used at a level of less than about 3 moles for each 8 moles of the polyalkylene oxide. Preferably less than about 2.8 moles of water is used. It should be understood that oftentimes the components other than the diisocyanate used in the reaction as well as any solvent medium used will contain water, usually in trace amounts. It is necessary that the water brought into the reaction mixture by these sources be accounted for and adjusted either by partially drying the reaction mixture or by adding more water so as to come within the proper level of water as above indicated. The level of water used in forming the rheology modifiers has an effect on their viscosity modifying characteristics. It is theorized the water is responsible for the formation of urea and other groups within the molecule.

Components in addition to those discussed above can be included in the reaction mixture provided they do not interfere with the reaction or materially affect the properties of the resultant rheology modifier. Thus, components such as monofunctional materials, non-polyalkylene oxide polyols and lower molecular weight polyols can be included in the reaction mixture at low levels, generally less than about 10% by weight. Preferably, however, the rheology modifiers of this invention are derived solely from the four components discussed in the paragraphs immediately above.

The process steps used with the above levels of reactants in making the rheology modifier comprises blending all the components together in a compatible solvent medium and heating to a temperature ranging from about 100° C. to about 130° C. until a constant viscosity is achieved. Alternatively, the components can be individually added in any order and reacted at the aforementioned elevated temperature. The organic medium used is a solvent which is compatible with a water-based or organic solvent-based coating composition. Compatible solvents are used since it is a desired objective that the rheology modifier as made be in a fluid form which can be added directly to a coating composition without a need to remove any incompatible solvent medium used in its preparation. This objective is particularly different to meet with water-based coating compositions in that many solvents used in reactions of the present type are not compatible with the water-based compositions. Solvents found to be compatible with the coating compositions, including the water-based compositions, include 1-methyl-2-pyrrolidinone, dimethyl formamide, dimethyl acetamide, gamma butyrolactone, dioxane, dimethyl and diethyl ethers of ethylene glycol and diethylene glycol, acetonitrile and mixtures thereof. Any of several inert solvents can also be used in minor amounts, i.e. less than about 20% of the total solvent level. Thus, benzene, toluene, xylene, ethyl acetate, and butyl acetate can be used. A preferred compatible solvent is the 1-methyl-2-pyrrolidinone.

After the above reactants are reacted in the manner discussed, there is aded either a monofunctional active hydrogen-containing compound or a monoisocyanate. The monofunctional active hydrogen-containing compound is used in the reaction discussed in preceeding paragraphs when an excess of isocyanate groups is present while a monoisocyanate is used when an excess of hydroxyl groups is present. The purpose of this addition is to end-cap substantially all free isocyanate or hydroxyl groups. Accordingly, the amount of end-capping material added is dependent on the amount of other reactants in the reaction. The exact amount needed to end-cap free isocyanate or hydroxyl groups is readily calculated. A further check that substantially all active end groups have been capped can be made after the addition by analytically determining the free isocyanate content or hydroxyl value of the mixture.

Example of monofunctional active hydrogen compounds include aliphatic alcohols such as ethanol, octanol, dodecanol and hexadecanol; fatty acids; phenolics such as phenol, cresol, octylphenol and dodecyl phenol; and alcohol ethers such as the monomethyl-, monoethyl- and monobutyl ethers of ethylene glycol and diethylene glycol. Examples of monoisocyanates include the straight chain, branched chain and cyclic isocyanates such as butyl isocyanate, octyl isocyanate, dodecylisocyanate, octadecyl isocyanate and cyclohexyl isocyanate. The temperature maintained during the end-capping step can vary widely, e.g. from about 20° C. to about 140° C.

In a preferred method of making the rheology modifiers, a polyhydric material such as ethylene glycol, propylene glycol, or glycerine is added after the end-capping is substantially complete. This addition reduces the mixture's viscosity thereby making it easier to handle. For maximum ease of handling, the mixture's temperature is maintained at about 100° C. to about 130° C. while the polyhydric material is added. The amount of polyhydric material added can vary widely, generally with amounts from about 50% to about 500% of the polyhydric material, based on the reactive components being used.

The aforedescribed modifiers can be used in water-based compositions as well as organic solvent-based compositions. They are most useful in coating compositions, especially the water-based latex coating compositions.

The examples which follow are illustrative of the invention.

EXAMPLE I

A rheology modifier is derived from the following reactants according to the procedure set out below:

|  | Molar ratio |
| --- | --- |
| Polyethylene oxide (M.V. 6000) | 8 |
| Trimethylolpropane | 0.3 |
| Toluene diisocyanate | 9.0 |
| Water | — |
| Fatty acid | 0.7 |

A reaction vessel is initially charged with 300.1 parts 1-methyl-2-pyrrolidinone (available from GAF Corp. and hereinafter referred to as M-pyrol), 506.3 parts polyethylene oxide (available from Union Carbide Corp. as Carbowax 6000) and 5 parts of a 10% trimethylolpropane solution. Under a nitrogen blanket, the reaction vessel is heated to 205° C. About 57 parts distillate is removed during this stage. The mixture is next cooled to 150° C. and a 1% dibutyl tin dilaurate catalyst solution in M-pyrol is added at a level of 10.5 parts while maintaining the reaction temperature at 140° C. Sixteen four-tenths (16.4) parts toluene diisocyanate is next added using an isocyanate pump, followed by a rinse with 28.0 parts M-pyrol. After about a one-hour hold period, 28.0 additional parts of the M-pyrol is added followed by an addition of 2.0 parts of a fatty acid end capper (available from Emery Industries as Emersol 315). After another hold period of about ½ hours at 140° C., 660.0 parts deionized water is added. The final reaction mixture has a viscosity of Z-3 and a 15% solids content.

EXAMPLE II

Another rheology modifier of this invention is made from the following reactants:

|  | Molar ratio |
| --- | --- |
| Polyethylene oxide (M.W. 6000) | 8 |
| Trimethylolpropane | 0.5 |
| Bis para-isocyanato cyclohexylmethane | 9.4 |
| Water | — |
| Fatty acid | 2.2 |

A reaction vessel is initially charged with 498.9 parts of polyethylene oxide (Carbowax 6000), 6.5 parts of a 10% trimethylopropane solution, and 302.6 parts M-pyrol. The reaction mixture is heated at 212° C. under a nitrogen blanket to remove 64.6 parts distillate. The mixture is cooled to 110° C. and 10.5 parts of a 1% solution of dibutyl tin diluarate is added. Next 25.6 parts of bis para-isocyanato cyclohexylmethane (available from E. I. DuPont de Nemours and Co. as Hylene W) and 43.0 additional parts M-pyrol are added while maintaining the temperature at about 105°-110° C. The mixture is held for about two hours. At this point, 6.3 parts of 4% rare earth dispersion in a fatty acid (Emersol 315) and 21.0 parts M-pyrol are added and the mixture held at 110° C. for one hour. Next 334.1 parts water are added and then 334.1 parts propylene glycol is added.

The resultant rheology modifier has a Z-3 viscosity and a 15% solids content.

EXAMPLE III

A rheology modifier is derived from the following reactants according to the procedure set out below:

|  | Molar ratio |
| --- | --- |
| Polyethylene oxide (M.W. 8000) | 8.0 |
| Trimethylolpropane | 1.5 |
| Bis para-isocyanato cyclohexylmethane | 12.8 |
| Water | 0.2 |
| Octadecyl isocyanate | 2.2 |

A reaction vessel is initially charged with 400 parts 1-methyl-2-pyrrolidinone (M-pyrol), 100 parts cyclohexane, 500 parts polyethylene oxide (available from Union Carbide Corp. as Carbowax 6000) and 1.5 parts trimethylolpropane. The reaction vessel is now heated to azotrope off 6.8 parts water. The water content of the mixture at this point is 0.058%. A 1% dibutyl tin dilaurate catalyst solution in M-pyrol is then added at a level of 10 parts while maintaining the reaction temperature at 110° C. Twenty-six and two-tenths (26.2) parts of bis para-isocyanato cyclohexylmethane (available from E. I. Dupont de Nemours and Co. as Hylene W) is next added using an isocyanate pump, followed by a rinse with 10 parts M-pyrol. After about a three-hour hold period at 115°-120° C., 10 additional parts of M-pyrol and 4.4 parts octahexyl isocyanate are now added. This is followed by an addition of 1,548 parts propylene glycol. After a hold period of twenty minutes at 115° C., 502 parts deionized water and 501 parts propylene glycol are added. The final reaction mixture has a viscosity of Z-3 and a 15% solids content.

The reaction products of Examples I through III all have rheology modifying properties when incorporated into both latex and organic solvent based coating compositions.

What is claimed is:

1. A process for making a urethane rheology modifier characterized in having a branched structure and hydrophobic tails, comprising the steps of:
   (1) reacting in an organic solvent
   (a) for each 8 moles of a polyalkylene oxide having a molecular weight of from about 2,000 to about 20,000;
   (b) about 0.1 moles to about 3 moles of a polyfunctional material, wherein said material has at least 3 active hydrogens capable of reacting with isocyanate or is a polyisocyanate having at least 3 isocyanate groups;
   (c) about 4 moles to about 15 moles of a diisocyanate;
   (d) less than about 3 moles water; and
   (e) an amount of additional diisocyanate to compensate for any water present,
wherein the organic solvent is selected from the group consisting of 1-methyl-2-pyrrolidinone, dimethyl formamide, dimethyl acetamide, gamma butyrolactone, dioxane, dimethyl and diethyl ethers of ethylene glycol and diethylene glycol, acetonitrile, and mixtures thereof; and (2) end-capping the reaction product of step (1) with a monofunctional active hydrogen-containing compound or monoisocyanate so as to cap substantially all free isocyanate or hydroxyl groups.

2. The process of claim 1 wherein the organic solvent is 1-methyl-2-pyrrolidinone.

3. The process of claim 2 wherein the components of step (1) are reacted until a constant viscosity is achieved.

4. The process of claim 1 wherein a polyhyric material is added after addition of the monofunctional active hydrogen-containing compound or monoisocyanate.

5. The process of claim 4 wherein the polyhydric material is selected from the group consisting of ethylene glycol, propylene glycol, glycerine, and mixtures thereof.

6. The process of claim 5 wherein the polyhydric material is propylene glycol.

7. The process of claim 6 wherein a temperature of from about 100° C. to about 130° C. is maintained while the polyhydric material is added.

8. The process of claim 7 wherein the mixture of step (1) is reacted at a temperature ranging from about 100° C. to about 130° C.

9. The process of claims 1 or 7 wherein the polyfunctional material (b) of step (1) is selected from the group consisting of polyols, amines, amine alcohols, thiols, polyisocyanates and mixtures thereof.

10. The process of claim 9 wherein the polyfunctional material is the polyisocyanate.

11. The process of claim 9 wherein the polyfunctional material is a trifunctional alcohol.

12. The process of claim 11 wherein the polyalkylene oxide is a polyethylene oxide having a molecular weight of from about 4,000 to about 12,000.

13. The process of claim 12 wherein the diisocyanate is selected from the group consisting of toluene diisocyanate, isophorone diisocyanate, bis para-isocyanato cyclohexylamine and mixtures thereof.

14. The process of claim 13 wherein the reaction mixture of step (1) comprises from about 0.5 mole to about 3 moles of the polyfunctional material, from about 6 moles to about 12 moles of the diisocyanate, less than about 2.8 moles of the water, and additional diisocyanate to compensate for any water present for each 8 moles of the polyalkylene oxide.

15. The process of claim 14 wherein polyethylene oxide, trimethylolpropane, bis para-isocyanato cyclohexylmethane and water are reacted.

* * * * *